United States Patent
Pettigrew et al.

(10) Patent No.: US 8,631,174 B2
(45) Date of Patent: Jan. 14, 2014

(54) SYSTEMS, METHODS, AND APPARATUS FOR FACILITATING COMMUNICATIONS BETWEEN AN EXTERNAL CONTROLLER AND FIELDBUS DEVICES

(75) Inventors: William Robert Pettigrew, Blacksburg, VA (US); Justin Brandon Chong, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 12/764,576

(22) Filed: Apr. 21, 2010

(65) Prior Publication Data

US 2011/0264832 A1 Oct. 27, 2011

(51) Int. Cl.
| | | |
|---|---|---|
| G06F 3/00 | (2006.01) | |
| G06F 13/00 | (2006.01) | |
| G06F 5/00 | (2006.01) | |
| G06F 13/12 | (2006.01) | |
| G06F 15/177 | (2006.01) | |
| G06F 15/173 | (2006.01) | |
| G06F 15/16 | (2006.01) | |
| H04B 7/00 | (2006.01) | |
| H04W 4/00 | (2009.01) | |
| H04L 12/28 | (2006.01) | |
| H04J 3/00 | (2006.01) | |
| G01R 31/08 | (2006.01) | |

(52) U.S. Cl.
USPC .......... 710/62; 710/15; 710/16; 710/17; 710/31; 710/33; 710/58; 370/225; 370/227; 370/310; 370/328; 370/351; 370/464; 709/220; 709/221; 709/223; 709/224; 709/226; 709/227

(58) Field of Classification Search
USPC .......... 710/15–17, 31, 58, 62, 33; 709/200, 709/204, 226–227, 220–221, 223–224; 370/310, 469, 328, 225, 227, 351, 464; 713/170

See application file for complete search history.

(56) References Cited

U.S. PATENT DOCUMENTS

| | | | | |
|---|---|---|---|---|
| 5,859,959 | A * | 1/1999 | Kimball et al. | 714/4.4 |
| 5,905,714 | A * | 5/1999 | Havansi | 370/242 |
| 6,452,934 | B1 * | 9/2002 | Nakata | 370/428 |
| 6,826,590 | B1 * | 11/2004 | Glanzer et al. | 709/200 |
| 6,981,020 | B2 * | 12/2005 | Miloslavsky et al. | 709/204 |
| 7,043,663 | B1 * | 5/2006 | Pittelkow et al. | 714/4.4 |
| 7,519,083 | B2 * | 4/2009 | Stevenson et al. | 370/469 |
| 7,583,593 | B2 * | 9/2009 | Guichard et al. | 370/225 |
| 7,660,254 | B2 * | 2/2010 | Vasseur et al. | 370/237 |
| 7,930,042 | B2 * | 4/2011 | El-Sayed | 700/21 |
| 8,199,638 | B2 * | 6/2012 | Taylor et al. | 370/228 |
| 2002/0091838 | A1 * | 7/2002 | Rupp et al. | 709/227 |
| 2003/0142795 | A1 * | 7/2003 | Gavette et al. | 379/67.1 |
| 2004/0064699 | A1 * | 4/2004 | Hooker et al. | 713/170 |
| 2004/0170138 | A1 * | 9/2004 | Blevins et al. | 370/328 |
| 2004/0190500 | A1 * | 9/2004 | Wratten | 370/352 |

(Continued)

*Primary Examiner* — Farley Abad
*Assistant Examiner* — Henry Yu
(74) *Attorney, Agent, or Firm* — Sutherland Asbill & Brennan LLP

(57) ABSTRACT

Systems, methods, and apparatus for facilitating communications between an external controller and Fieldbus devices are described. A primary linking device in communication with the controller and one or more Fieldbus devices may be configured to direct the communication of a timing message to the controller and determine whether a response to the timing message has been received from the controller. Based upon the determination, the primary linking device may direct a switching of communications control to a secondary linking device.

19 Claims, 2 Drawing Sheets

(56) References Cited

U.S. PATENT DOCUMENTS

| | | | |
|---|---|---|---|
| 2004/0207574 A1* | 10/2004 | Arai et al. | 345/75.1 |
| 2005/0071725 A1* | 3/2005 | Gibart | 714/755 |
| 2005/0085231 A1* | 4/2005 | Dillinger et al. | 455/445 |
| 2006/0126495 A1* | 6/2006 | Guichard et al. | 370/216 |
| 2009/0034441 A1* | 2/2009 | Budampati et al. | 370/310 |
| 2009/0083001 A1* | 3/2009 | Huisenga et al. | 702/185 |
| 2010/0312891 A1* | 12/2010 | Pairault et al. | 709/226 |

* cited by examiner

SYSTEMS, METHODS, AND APPARATUS FOR FACILITATING COMMUNICATIONS BETWEEN AN EXTERNAL CONTROLLER AND FIELDBUS DEVICES

FIELD OF THE INVENTION

Embodiments of the invention relate generally to control systems and more specifically to facilitating communications between Fieldbus devices and an external controller.

BACKGROUND OF THE INVENTION

Control systems are utilized in a wide variety of different applications. For example, control systems are utilized in conjunction with power generating devices, in power plants, and/or in process plants. A control system typically includes a central controller in communication with other components of the control system, for example, sensors, measurement devices, valves, etc. The central controller typically communicates with the other components via suitable network communications.

With the development and adoption of the Foundation Fieldbus standard, Fieldbus devices have been incorporated into control systems. Due to differences in operating speeds between the Fieldbus devices and the central controller, linking devices are typically utilized to facilitate communications between the Fieldbus devices and the central controller. However, any number of network switches, such as Ethernet switches, may be present between a linking device and the central controller. A failure or a loss in connectivity in one or more of the switches, or other network errors, may lead to a loss in network connectivity between the linking device and the central controller, thereby interrupting continuous control of the Fieldbus devices by the central controller. Accordingly, improved systems, methods, and apparatus for facilitating communications between Fieldbus devices and an external controller or an external control system would be desirable.

BRIEF DESCRIPTION OF THE INVENTION

Some or all of the above needs and/or problems may be addressed by certain embodiments of the invention. Embodiments of the invention may include systems, methods, and apparatus for facilitating communications between Fieldbus devices and an external controller. According to one embodiment of the invention, there is disclosed a linking device for facilitating communications between an external controller and at least one Fieldbus device. The linking device may include at least one communications interface and at least one processing component. The at least one communications interface may be configured to communicate a timing message to the controller. The at least one processing component may be configured or programmed to direct the communication of the timing message by the communications interface and determine whether a response to the timing message has been received from the controller. Based upon the determination, the at least one processing component may direct a switching or switchover of communications control to a second linking device that facilitates communications between the controller and the at least one Fieldbus device.

According to another embodiment of the invention, there is disclosed a method for facilitating communications between at least one Fieldbus device and an external controller. A primary linking device and a secondary linking device that are respectively configured to facilitate communications between the controller and the at least one Fieldbus device may be provided. The communications may initially be controlled by the primary linking device. A timing message may be output by the primary linking device for receipt by the controller. A determination may then be made by the primary linking device as to whether a response to the timing message has been received from the controller. Based upon the determination, the primary linking device may direct a switching or switchover of communications control to the secondary linking device.

According to another embodiment of the invention, there is disclosed a system for establishing communication between an external controller and at least one Fieldbus device. The system may include a first linking device configured to facilitate communications between the controller and the at least one Fieldbus device and a second linking device configured to facilitate redundant communications between the controller and the at least one Fieldbus device. The first linking device may be configured to output a timing message for communication to the controller and to determine whether a response to the first timing message has been received from the controller. Based upon the determination, the first linking device may further be configured to direct a switching or switchover of communications control to the second linking device.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
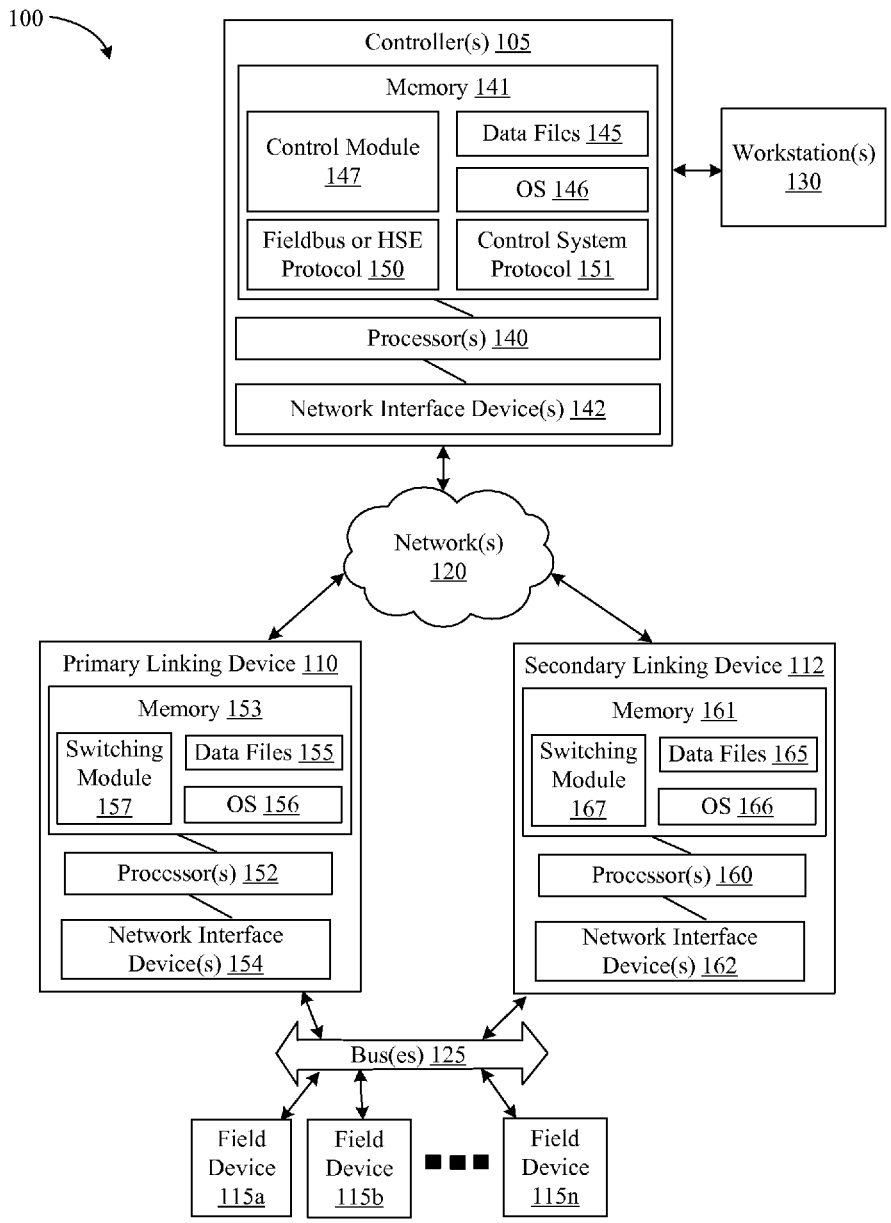

Having thus described the invention in general terms, reference will now be made to the accompanying drawings, which are not necessarily drawn to scale, and wherein:

FIG. 1 is a schematic diagram of one example control system that may be utilized in accordance with various embodiments of the invention.

Figure 2:
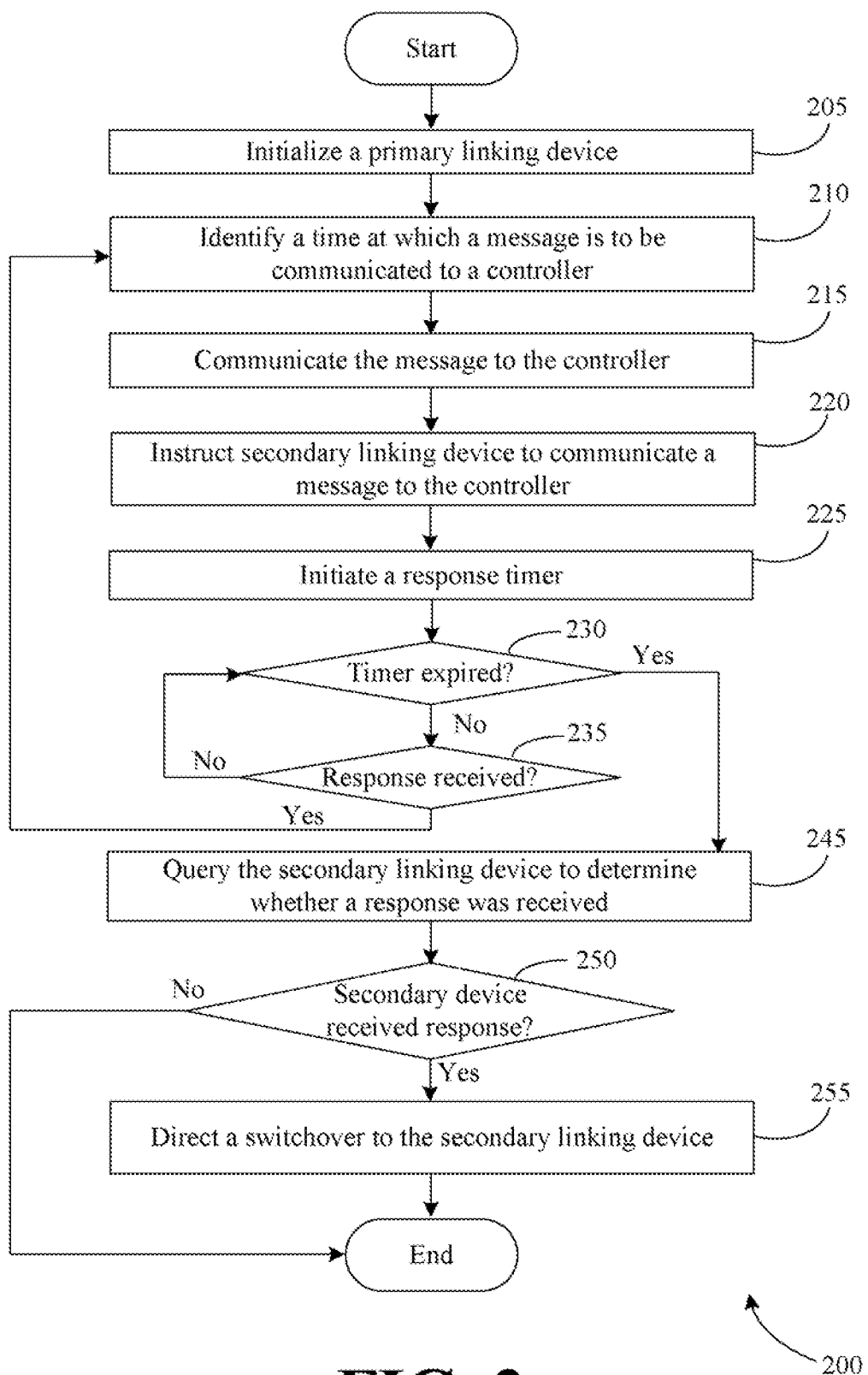

FIG. 2 is a flow chart of one example method for facilitating communication between one or more Fieldbus devices and an external control system, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for facilitating communication between one or more Fieldbus devices and an external controller or an external control system. In accordance with various embodiments of the invention, a plurality of redundant linking devices may be provided in order to facilitate communication between the Fieldbus devices and the external controller. For example, a primary linking device and a secondary linking device may be provided. The primary linking device may detect a loss in network connectivity with the controller and direct a switching or switchover of communications control to the secondary linking device. In certain embodiments, the switching may be directed based upon an additional determination that network connectivity exists between the secondary linking device and the external controller. As desired in certain embodiments, the secondary linking device may be established as a primary device following the switchover.

In one example embodiment, a first linking device, such as the primary linking device, may direct the output of a timing message, such as a timing message that is periodically output at a predetermined interval, for communication to the external controller. The first linking device may then determine whether a response to the timing message has not been received form the external controller. For example, the first linking device may determine that a response is not received within a predetermined time period or prior to the expiration of a timer. Based upon the determination of whether a response has been received, the first linking device may direct a switching or switchover in communications control to a second linking device, such as a secondary linking device. In certain embodiments, the switchover may be based upon a further determination by the first linking device that network connectivity exists between the second linking device and the external controller. For example, the first linking device may determine whether a response to a second timing message output by the second linking device has been received by the second linking device. In certain embodiments, the first linking device may query the second linking device in order to determine whether a response to the second timing message has been received by the second linking device from the external controller. In this regard, a switchover may be directed in situations where network connectivity is still available between the external controller and the Fieldbus devices via the second linking device.

Various embodiments of the invention may include one or more special purpose computers, systems, and/or particular machines that facilitate communication between Fieldbus devices and an external controller. Additionally, various embodiments may include one or more special purpose computer, systems, and/or particular machines that facilitate switching over communications control from a first linking device to a second linking device. A special purpose computer or particular machine may include a wide variety of different software modules and/or computer-implemented or computer-executable instructions as desired in various embodiments. As explained in greater detail below, in certain embodiments, these various software components may be utilized to monitor network connectivity between an external controller and a plurality of linking devices in order to maintain communication between the external controller and one or more Fieldbus devices that are connected to the linking devices.

Certain embodiments of the invention described herein may have the technical effect of facilitating communication between Fieldbus devices and an external controller. Additionally, certain embodiments of the invention may have the technical effect of monitoring network connectivity between an external controller and a plurality of linking device and/or facilitating switching over communications control from a first linking device to a second linking device. In this regard, network connectivity between an external controller and Fieldbus devices may be maintained even if network connectivity with one or more linking devices that facilitate communications between the controller and the Fieldbus devices is lost.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet (HSE) devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a central controller of the control system. Additionally, the term HSE protocol may be utilized to refer to a Fieldbus protocol that facilitates communications with HSE Fieldbus devices.

Communications between Fieldbus devices and/or between one or more controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

FIG. 1 is a block diagram of one example control system 100 that may be utilized in accordance with various embodiments of the invention. The control system 100 may include one or more controllers 105 (e.g., central controllers) and/or control devices, a first linking device 110, a second linking device 112, and/or one or more Fieldbus devices 115*a-n*. The controller 105 may communicate with the linking devices 110, 112 via one or more suitable networks 120 or communications buses. Additionally, the linking devices 110, 112 may communicate with the Fieldbus devices 115*a-n* via one or more suitable buses 125 or networks.

As desired, any number of linking devices, including the first linking device 110 and the second linking device 112, may be utilized in association with the control system 100. The linking devices 110, 112 may be devices that are capable of communicating via a Fieldbus network or bus and via one or more relatively higher speed networks that facilitate communications with the controller 105. For example, a linking device 110, 112 may be a HSE Fieldbus device or a combination HSE/H1 device. As such, the linking device 110, 112 may be capable of communicating with the controller 105 via a suitable Ethernet network or other suitable network. Additionally, the linking device 110, 112 may be capable of communicating with connected Fieldbus devices 115*a-n* via one or more Fieldbus networks and/or data buses. As desired, the linking devices 110, 112 may facilitate communication between the controller 105 and the Fieldbus devices 115*a-n*.

As desired, a linking device 110, 112 may include any number of segments and/or connections to which a Fieldbus data bus 125 or local Fieldbus network may be connected. For example, in certain embodiments, a linking device 110, 112 may include four (4) segments, although any other number of segments may be included as desired. Each segment may establish a separate communications channel and be configured to facilitate communications between the linking device 110 and the Fieldbus devices connected to the segment.

According to an aspect of the invention, the linking devices 110, 112 may provide redundant communications capability and/or connectivity between the controller 105 and the Fieldbus devices 115a-n. For example, a first linking device 110 or primary linking device may control communications between the controller 105 and the Fieldbus devices 115a-n connected to the primary linking device 110. Based upon a determination by the primary linking device 110 that network connectivity with the controller 105 is lost, the primary linking device 110 may be configured to switchover communications control to the second linking device 112 or a secondary linking device. In certain embodiments, the switchover of communications control may further be based upon a determination by the primary linking device 110 that network connectivity still exists between the secondary linking device 110 and the controller 105.

In operation, a linking device, such as the primary linking device 110, may be configured to transmit or output a message, such as a timing message, multicast message, etc., for communication to the controller 105. For example, a timing message or multicast message may be periodically output in accordance with a predetermined or preset time interval. A wide variety of time intervals may be utilized as desired in various embodiments of the invention, such as a time interval of approximately five hundred (500) milliseconds. In certain embodiments, the time interval may be set or established by the controller 105 or by a user of the linking device 110. As desired in certain embodiments, the primary linking device 110 may also direct a secondary linking device 112 to output a second timing message. Alternatively, the secondary linking device 112 may be configured to periodically output a second timing message in a similar manner as the primary linking device 110.

Following the output of the timing message, the primary linking device 110 may determine whether a response to the message is received from the controller 105. For example, the linking device 110 may determine whether a response is received within a particular timing threshold period or prior to the expiration of a timer that is initiated by the linking device 110 when the message is output. A wide variety of timing thresholds and/or initial timer values may be utilized as desired in various embodiments of the invention. If it is determined that a response is received, then the linking device 110 may maintain its current state of operation. However, if it is determined that no response is received, then the primary linking device 110 may direct a switching or switchover of communications control to the secondary linking device 112. As desired, the primary linking device 110 may determine whether network connectivity between the secondary linking device 112 and the controller 105 exists prior to initiating or directing a switchover. For example, the primary linking device 110 may query the secondary linking device 112 in order to determine whether the secondary linking device 112 received a response from the controller 105 to a second timing message that was output by the secondary linking device 112. Based upon a response to the query, the primary linking device 110 may determine whether a second timing message was output by the secondary linking device 112 and/or whether a response to the second timing message was received. If it is determined that no response to the second timing message was received by the secondary linking device 112, then the primary linking device 110 may not perform a switchover and, as desired, may generate an error message or take some other control action in order to indicate that network connectivity has been lost. However, if it is determined that a response to the second timing message was received by the secondary linking device 112, then the primary linking device 110 may direct a switchover of communications control to the secondary linking device 112. For example, the secondary linking device 112 may be designated as a new primary linking device. In this regard, network connectivity between the controller 105 and the Fieldbus devices 115a-n may be maintained even if network connectivity with the primary linking device 110 is lost.

With continued reference to FIG. 1, any number of Fieldbus devices 115a-n may be utilized in association with the control system 100. In certain embodiments, each Fieldbus device (generally referred to as device 115) may be in communication with one or more linking devices 110, 112 via a local Fieldbus network or data bus 125. In this regard, communications between the Fieldbus device 115 and the controller 105 may be facilitated by one or more of the linking devices 110, 112. A wide variety of different types of Fieldbus devices may be utilized as desired in various embodiments of the invention, including any number of H1 Fieldbus devices and/or other suitable devices. In certain embodiments, the Fieldbus devices 115a-n may be distributed or situated at varying points within a power plant or process plant. In this regard, the Fieldbus devices 115a-n may be utilized to monitor and/or control various aspects and/or operations of a plant. In certain embodiments, communications between the linking devices 110, 112 and the Fieldbus devices 115a-n may be facilitated using the Fieldbus protocol.

With continued reference to FIG. 1, the one or more illustrated networks 120 may include any suitable network or combination of networks that facilitate communications between the linking devices 110, 112 and the controller 105. Similarly, the Fieldbus data buses 125 or networks may include any number of suitable data buses and/or local area networks that facilitate communication between a linking device 110, 112 and Fieldbus devices 115a-n that are connected to the linking device 110, 112. Examples of suitable networks and/or data buses include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network 120. Each of the Ethernet switches may include hardware and/or software components that are operable to facilitate the routing of data within the network 120. Examples of suitable Ethernet switches include, but are not limited to, network bridges, multilayer switches, etc.

With continued reference to FIG. 1, the control system 100 may include a controller 105, such as a central controller. Some examples of suitable controllers are a Mark™ VI control system and a Mark™ Vie control system produced by the General Electric Company. The controller 105 may be configured to communicate with and/or control other components of the control system 100 and/or components of the plant or system that is controlled by the control system 100. Additionally, the controller 105 may be configured to receive data associated with the operation of the Fieldbus devices 115a-n and/or the linking devices 110, 112, to process at least a portion of the received data, and/or to output one or more control signals or other messages for receipt by the linking devices 110, 112 and/or Fieldbus devices 115a-n.

The controller 105 may include any number of processor driven devices that control the operations of the control system 100. For example, the controller 105 may include any number of special purpose computers or particular machines, application specific circuits, programmable logic controllers (PLC), microcontrollers, personal computers, minicomputers, mainframe computers, supercomputers, and the like. In certain embodiments, the operations of the controller 105 may be controlled by computer-executed or computer-implemented instructions that are executed by one or more processors associated with the controller 105. The instructions may be embodied in one or more software components as desired in various embodiments of the invention. The execution of the instructions may form a special purpose computer or other particular machine that is operable to control the operations of the control system 100. The one or more processors that control the operations of the controller 105 may be incorporated into the controller 105 and/or in communication with the controller 105 via one or more suitable networks. In certain embodiments of the invention, the operations and/or control of the controller 105 may be distributed amongst several processing components.

The controller 105 may include one or more processors 140, one or more memory devices 141, and one or more network interface device(s) 142. The one or more memory devices 141 may be any suitable memory devices, for example, caches, read only memory devices, random access memory devices, magnetic storage devices, etc. The one or more memory devices 141 may store data, executable instructions, and/or various program modules utilized by the controller 105, for example, data 145 associated with the operation of the control system, linking devices 110, 112, and/or Fieldbus devices 115a-n, an operating system 146, and/or a control module 147. Additionally, the memory 141 may be operable to store a Fieldbus or HSE protocol 150 and/or a second control system protocol 151 that facilitates communication with other components of the control system 100, such as one or more workstations 130 at which an operator may be presented with information associated with the control system operation and/or enter user commands. The data 145 may include any suitable data associated with the operation of the control system 100 and/or the operation of the plant or system monitored by the control system 100, for example, measurements data, operating data, data associated with the operation of one or more linking devices 110, 112, data associated with the operation of one or more Fieldbus devices 115a-n, etc. The operating system (OS) 146 may include executable instructions and/or program modules that facilitate and/or control the general operation of the central controller 105. For example, the OS 146 may facilitate the execution of other software programs and/or program modules by the processors 140.

The control module 147 may be operable to monitor and/or control the overall operations of the control system 100 and/or the plant or system that is monitored and/or controlled by the control system 100. In doing so, the control module 147 may utilize various measurements and/or other data associated with the operation of the control system 100 and/or the monitored plant or system. At least a portion of the utilized data may be received from the Fieldbus devices 115a-n either directly or via the linking devices 110, 112. The control module 147 may be further operable to generate command signals associated with the operation of the control system 100 and to direct the communication of the generated signals to other components of the control system 100, for example, to the Fieldbus devices 115a-n. For example, the control module 147 may be operable or configured to process data received from one or more Fieldbus devices 115a-n and direct the communication of generated control signals or other messages to the Fieldbus devices 115a-n. Additionally, the control module 147 may be operable or configured to receive a timing message or multicast message from one or more linking devices 110, 112 and output a response to the received message for communication to the linking device 110, 112 from which the message was received. In this regard, a linking device 110, 112 may determine whether network connectivity with the controller 105 is established.

As desired, a communications module may be associated with the controller 105 and operable to format and/or generate communications to be transmitted over the network 120. Additionally, the communications module may be operable to receive communications that have been transmitted to the central controller 105 and to extract data from the received communications. The communications module may utilize both the Fieldbus or HSE protocol 150 and/or one or more other protocols, such as the control system or second protocol 151, during the formatting of communications. In certain embodiments, the communications module may receive timing message and/or output responses to the timing messages.

With continued reference to FIG. 1, the network interface devices 142 may facilitate connection of the controller 105 to the network 120 and/or to the workstations 130. The network interface devices 142 may include any number of input/output cards (e.g., Ethernet cards) and/or other devices that facilitate network communications.

Similar to the controller, the primary linking device 110 may include any number of processor driven devices and/or processing components that facilitate the operations of the linking device 110 and/or a switching or switchover to the secondary linking device 112. For example, the primary linking device 110 may include any number of special purpose processing components, computing devices, particular machines, application specific circuits, programmable logic controllers (PLC), microcontrollers, minicomputers, and the like. In certain embodiments, the operations of the primary linking device 110 may be controlled by computer-executed or computer-implemented instructions that are executed by one or more processors or processing components associated with the primary linking device 110. The instructions may be embodied in one or more software components as desired in various embodiments of the invention. The execution of the instructions may form a special purpose computer or other particular machine that is operable to control the operations of the primary linking device 110 and/or to facilitate a switching or switchover to the secondary linking device 112. The one or more processing components that control the operations of the primary linking device 110 may be incorporated into the primary linking device 110 and/or in communication with the primary linking device 110 via one or more suitable networks. In certain embodiments of the invention, the operations and/or control of the primary linking device 110 may be distributed amongst several processing components.

The primary linking device 110 may include one or more processors 152, one or more memory devices 153, and one or more network interface device(s) 154 or communications interface devices. The one or more memory devices 153 may be any suitable memory devices, for example, caches, read only memory devices, random access memory devices, magnetic storage devices, etc. The one or more memory devices 153 may store data utilized by the primary linking device 110, for example, data 155 associated with the operation of the primary linking device 110, data associated with the controller 105, data associated with the Fieldbus devices 115a-n, data associated with the output of timing messages, etc. Additionally, the one or more memory devices 153 may store executable instructions, and/or various program modules utilized by the primary linking device 110, such as an operating system 156, and/or a switching module 157. Additionally, as desired, the memory 153 may be operable to store a Fieldbus or HSE protocol that facilitates communication with other components of the control system 100, such as the controller 105 and/or the Fieldbus devices 115a-n. The operating system (OS) 156, which may be optional in certain embodiments of the invention, may include executable instructions and/or program modules that facilitate and/or control the general operation of the primary linking device 110. For example, the OS 156 may facilitate the execution of other software programs and/or program modules by the processors 152.

The switching module 157 may facilitate the determination or identification of a specific time or point in time at which a timing message or multicast message will be output by the primary linking device 110 and, as desired, by the secondary linking device 112. For example, the switching module 157 may determine a predetermined time interval (e.g., 500 milliseconds) for outputting a timing message, and the switching module 157 may utilize the time interval in association with a linking device clock signal in order to determine a point in time at which a timing message will be output. The switching module 157 may then direct the output of a timing message by the primary linking device 110 and, as desired, the secondary linking device 112, for communication to the controller 105. The switching module 157 may then determine whether a response to the output timing message(s) is received by the primary linking device 110 and/or the secondary linking device 112. Based upon these determinations, which are described in greater detail above and with subsequent reference to FIG. 2 below, the switching module 157 may determine whether communications control should be switched over to the secondary linking device 112. If a determination is made that a switchover should occur, then the switching module 157 may direct a switching or switchover.

An example of the operations that may be performed by a switching module 157, 167 is set forth in greater detail below with reference to FIG. 2.

With continued reference to the primary linking device 110, the network interface devices 154 may facilitate connection of the primary linking device 110 to the network 120 and/or to the Fieldbus bus(es) 125. The network interface devices 144 may include any number of input/output cards and/or other devices that facilitate network communications.

With continued reference to FIG. 1, the secondary linking device 112 may include similar components to the primary linking device 110. For example, the secondary linking device 112 may include one or more processors 160 or processing components, one or more memory devices 161, and/or one or more network interface devices 162 or communications interface devices. Each of these components may operate in a similar manner as the corresponding components of the primary linking device 110. For example, the memory devices 161 may be configured to store data files 165, an operating system 166, and/or a switching module 167 that are similar to the corresponding elements of the primary linking device 110.

In operation, the secondary linking device 112 may be configured or programmed to output a timing message or multicast message for receipt by the controller 105. In certain embodiments, a message may be periodically output in a similar manner as that described above for the primary linking device 110. In other embodiments, a message may be output at the direction of the primary linking device 110. The secondary linking device 112 may then determine whether a response to the timing message has been received from the controller 105 in a similar manner as that described above for the primary linking device 110. Based upon the determination, the secondary linking device 112 may store an indication of whether a response is received. The secondary linking device 112 may further be configured to receive a query message from the primary linking device 110 associated with whether the secondary linking device 112 received a response to the timing message, and the secondary linking device 112 may communicate an indication of whether or not a response was received to the primary linking device 110 in response to a query message. Alternatively, in certain embodiments, the secondary linking device 112 may output an indication of whether a response to a timing message was received without receiving a query message from the primary linking device 110. The primary linking device 110 may then utilize a received indication in order to determine whether communications control should be switched over to the secondary linking device 112.

In certain embodiments of the invention, one or more workstations 130 may be provided. As desired, these workstations 130 may provide a human machine interface (HMI) between the control system 100 and one or more operators of the control system 100. For example, the workstations 130 may facilitate the receipt of user input and/or user commands associated with the operation of the control system 100. In other words, the workstations 130 may facilitate user interaction with the controller 105. Additionally, the workstations 130 may be configured to receive data from the controller 105, such as presentations associated with the connected Fieldbus devices 115a-n. The workstations 130 may further be configured to display at least a portion of the received data to a user via a suitable display device, such as a monitor.

The workstations 130 may include one or more suitable computers or computing devices, such as personal computers, hand-held computing devices, mini-computers, etc. Additionally, the workstations 130 may be in communication with the controller 105 via one or more suitable network connections, for example, a direct link or direct connection, a local area network, a wide area network, the Internet, a radio frequency (RF) network, a Bluetooth™ enabled network, any suitable wired network, or any suitable wireless network. In this regard, user commands, instructions, and/or other input associated with the operation of the control system 100 may be received by the workstations 130 and communicated to the controller 105. Additionally, output data associated with the operations of the control system 100 and/or a plant or other system monitored by the control system 100 may be communicated to the workstations 130 by the controller 105 for output and/or display to a user.

As desired, embodiments of the invention may include a control system 100 with more or less than the components illustrated in FIG. 1. The control system 100 of FIG. 1 is provided by way of example only.

FIG. 2 is a flow chart of one example method 200 for facilitating communications between at least one Fieldbus device and an external controller or an external control system, according to an illustrative embodiment of the invention. The method 200 may be performed by a suitable linking device, such as the primary linking device 110 or the secondary linking device 112 illustrated in FIG. 1. The method may begin at block 205.

At block 205, a primary linking device 110 or first linking device may be initialized. The primary linking device 110 may facilitate communications between any number of Fieldbus devices, such as the Fieldbus devices 115a-n shown in FIG. 1, and an external controller, such as the controller 105 illustrated in FIG. 1. As desired in certain embodiments, the secondary linking device 112 or second linking device may also be initialized at block 205. The secondary linking device 112 may also facilitate communications between the Fieldbus devices 115a-n and the controller 105. For example, the secondary linking device 112 may provide redundant communication capability in addition to that provided by the primary linking device 110

At block 210, the primary linking device 110 may identify a specific time or a point in time at which a message, such as a timing message or multi-cast message, will be output by the primary linking device 110 for communication to the controller 105. In certain embodiments, the primary linking device 110 may be configured or programmed to output a timing message in a periodic manner. For example, a timing message may be periodically output in accordance with a predetermined time interval, such as an interval of approximately five hundred (500) milliseconds or any other suitable interval. The primary linking device 110 may utilize the predetermined time interval in order to identify a next specific time or a next point at time at which a timing message will be output.

At block 215, the primary linking device 110 may output a timing message or multi-cast message for communication to or receipt by the controller 105. For example, the primary linking device 110 may determine that an identified specific timer or point in time has been reached, and the primary linking device 110 may output at timing message based upon the determination. At block 220, which may be optional in certain embodiments of the invention, the primary linking device 110 may additionally direct the secondary linking device 112 to output a timing message for receipt by the controller 105. For example, the primary linking device 110 may communicate an instruction to output a timing message to the secondary linking device 112. Alternatively, the secondary linking device 112 may be configured to periodically output a timing message in a similar manner as that utilized by the primary linking device 110.

At block 225, the primary linking device 110 may initiate a response timer. The response timer may be utilized in order to monitor a time period in which a response to the output timing message should be received from the controller 105 in order to indicate that proper network connectivity is established between the primary linking device 110 and the controller 105. In certain embodiments, the timer may be a timer that counts up from approximately zero and a value of the timer may be compared to a predetermined threshold value. In other embodiments, the timer may have an initial value that is established at a predetermined threshold, and the timer may be configured to count down to zero. In either event, the timer may be utilized in order to determine whether a response to the timing message is received within a predetermined time interval or period associated with proper network connectivity. A wide variety of time intervals or periods may be utilized as desired in various embodiments of the invention.

At block 230, a determination may be made by the primary linking device 110 as to whether the timer has expired or whether a value of the timer has reached a threshold value. If it is determined at block 230 that the timer has not expired or that a threshold value has not been reached, then operations may continue at block 235. At block 235, a determination may be made as to whether a response to the output timing message has been received from the controller 105. If it is determined at block 235 that a response has been received, then operations may continue at block 210 described above. However, if it is determined at block 235 that a response has not been received, then operations may continue at block 230 and the primary linking device 110 may continue to monitor the timer.

However, if it is determined at block 230 that the timer has expired or that a threshold value has been reached, then it may be determined that proper network connectivity is not established between the primary linking device 110 and the controller 105. As desired, in certain embodiments, the primary linking device 110 may determine that a response is not received for a plurality of consecutive timing messages, such as two messages, three messages, etc., before the primary linking device 110 determines that proper network connectivity is not available or not established. In either case, operations may continue at block 245 once a determination has been made that proper network connectivity between the primary linking device 110 and the controller 105 is not available or not established.

At block 245, the primary linking device 110 may query the secondary linking device 112 in order to determine whether a response to a second timing message output by the secondary linking device 112 has been received by the secondary linking device 112 from the controller 105. For example, the primary linking device 110 may generate a query message that includes an instruction to provide data to the primary linking device that includes an indication of whether a second timing message was output by the secondary linking device 112 and/or whether a response to the second timing message has been received by the secondary linking device 112. Once generated, the query message may be output by the primary linking device 110 for communication to the secondary linking device 112. In certain embodiments, the primary linking device 110 may then receive a response to the query message from the secondary linking device 110. As an alternative to querying the secondary linking device 112, the primary linking device 110 may determine whether an indication has been received from the secondary linking device 112 as to whether a response to a second timing message has been received by the secondary linking device 110.

At block 250, a determination may be made as to whether the secondary linking device 112 received a response to a second timing message from the controller 105. For example, a determination may be made as to whether information associated with the second timing message has been received from the secondary linking device 112 and/or whether the received information indicates that a response to the second timing message was received. In this regard, a determination may be made as to whether network connectivity is established between the secondary linking device 112 and the controller 105. If it is determined at block 250 that the secondary linking device 112 did not receive a response to the second timing message, then operations may end without switching over communications control to the secondary linking device 112. Additionally, as desired, the primary linking device 110 may take one or more control actions in order to indicate that network connectivity between the controller 105 and the Fieldbus devices 115a-n has been lost. For example, the primary linking device 110 may output one or more network connectivity error messages for receipt by the controller 105, the workstations 130, and/or another other devices, such as a mobile device associated with an operator or supervisor of a power plant or process plant.

However, if it is determined at block 250 that the secondary linking received a response to a second timing message, then operations may continue at block 255. At block 255, the primary linking device 110 may direct a switching or switchover in communications control to the secondary linking device 112. For example, the primary linking device 110 may communicate a control signal to the secondary linking device 112 that instructs the secondary linking device 112 to take over communications control. In this regard, continuous network connectivity and/or communications between the controller 105 and the Fieldbus devices 115a-n may be maintained. As desired, the secondary linking device 112 may be established as a new primary linking device. The secondary linking device 112 may then perform a portion or all of the operations set forth in the method 200 of FIG. 2.

The method 200 may end following either block 250 or 255.

Although the method 200 set forth in FIG. 2 describes a method for switching between two linking devices 110, 112 that facilitate communications between an external controller 105 and one or more Fieldbus devices 115a-n, any number of redundant linking devices (e.g., three linking devices, four linking devices, etc.) may be utilized as desired in various embodiments of the invention. Additionally, in certain embodiments, a similar method may also be utilized for switching between redundant segments associated with a linking device 110. For example, one or more Fieldbus devices 115a-n may be connected to a plurality of segments associated with a linking device 110. Based upon a detection of a loss in network communications between a primary segment and the Fieldbus devices 115a-n, communications control may be switched or switched over to a secondary segment. In this regard, communications between the linking device 110 and the Fieldbus devices 115a-n may be maintained if there is a loss of network connectivity between the primary segment and the Fieldbus devices 115a-n.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A linking device for facilitating communications of one or more command signals between an external controller and at least one Fieldbus device, the linking device comprising:
    at least one communications interface configured to communicate special-purpose signals to the external controller, the special-purpose signals being a first timing message and a second timing message; and
    at least one processing component configured to:
        direct the communication of the first timing message and the second timing message by the communications interface, wherein the first timing message is output by a primary linking device for receipt by the external controller and the second timing message is output by a secondary linking device for receipt by the external controller, wherein the primary linking device and the secondary linking device are configured to communicate with each other;
        initiate a first timer and a second timer to monitor a first time period and a second time period, in which respective responses to the first timing message and the second timing message are received;
        determine whether a response to the first timing message has been received from the external controller by the primary linking device within a first predetermined time period based upon an evaluation of the first timer;

based on the determination that no response to the first timing message has been received from the external controller within the first time period, query, by the primary linking device, the secondary linking device, in order to determine whether the secondary linking device has received a response to the second timing message within the second time period based upon an evaluation of the second initiated timer;

receiving, at the primary linking device, a confirmation from the secondary linking device that the response to the second timing message has been received from the external controller by the secondary linking device within the second time period; and direct, based upon the confirmation, switching of communications control of the one or more command signals to the secondary linking device that facilitates communications between the external controller and the at least one Fieldbus device.

2. The linking device of claim 1, wherein the at least one processing component is further configured to:
determine whether the second linking device has received a response to a second timing message communicated to the external controller by the second linking device,
wherein the switching is directed based upon the determination that the second linking device has received a response to the second timing message from the external controller.

3. The linking device of claim 2, wherein the at least one processing component is further configured to direct the second linking device to output the second timing message.

4. The linking device of claim 2, wherein the at least one processing component is further configured to:
direct the communication of a query to the second linking device in order to determine whether the second linking device has received the response to the second timing message.

5. The linking device of claim 1, wherein the first timing message and the second timing message comprise messages that are periodically output at a predetermined time interval.

6. The linking device of claim 1, wherein the first timing message and the second timing message are communicated to the external controller via a local area network.

7. A method for facilitating communication of one or more command signals between an external controller and at least one Fieldbus device, the method comprising:
providing a primary linking device and a secondary linking device that are respectively configured to facilitate communications of the one or more command signals between the external controller and the at least one Fieldbus device, wherein the communication is initially controlled by the primary linking device, and wherein the primary linking device and the secondary linking device are configured to communicate with each other;
outputting, by the primary linking device, special-purpose signals for receipt by the external controller, the special-purpose signals being a first timing message and a second timing message, wherein the first timing message is output by the primary linking device for receipt by the external controller and the second timing message is output by the secondary linking device for receipt by the external controller;
initiating a first timer and a second timer to monitor a first time period and a second time period in which respective responses to the first timing message and the second timing message are received;
determining, by the primary linking device, whether a response to the first timing message has been received from the external controller within the first time period based upon an evaluation of the first timer;

based on the determination that no response to the first timing message has been received from the external controller within the first time period, querying, by the primary linking device, the secondary linking device in order for the primary linking device to determine whether the secondary linking device has received a response to the second timing message from the external controller within the second time period based upon an evaluation of the second initiated timer;

receiving, at the primary linking device, a confirmation from the secondary linking device that the response to the second timing message has been received from the external controller by the secondary linking device within the second time period; and directing, by the primary linking device based upon the confirmation, switching of communications control of the one or more command signals to the secondary linking device.

8. The method of claim 7, further comprising:
determining, by the primary linking device, whether the secondary linking device has received a response to a second timing message communicated to the external controller by the second linking device,
wherein directing the switching comprises directing the switching based upon the determination that the second linking device has received a response to the second timing message from the external controller.

9. The method of claim 8, further comprising:
directing, by the primary linking device, the secondary linking device to output the second timing message.

10. The method of claim 8, further comprising:
communicating, by the primary linking device, a query to the secondary linking device in order to determine whether the secondary linking device has received the response to the second timing message.

11. The method of claim 7, wherein outputting the first timing message and the second timing message comprises periodically outputting the first timing message and the second timing message at a predetermined time interval.

12. The method of claim 7, wherein outputting the first timing message and the second timing message comprises outputting the first timing message and the second timing message via a local area network.

13. The method of claim 7,
wherein determining whether the response has been received within the predetermined time period comprises determining that the response has not been received prior to a value of the timer reaching a threshold value.

14. A system for establishing communication between an external controller and at least one Fieldbus device, the system comprising:
a first linking device configured to facilitate communication of one or more command signals between the external controller and the at least one Fieldbus device; and
a second linking device configured to facilitate redundant communications between the external controller and the at least one Fieldbus device, wherein the first linking device and the second linking device are configured to communicate with each other, and
wherein the first linking device is configured to output special-purpose signals for communication to the external controller, the special-purpose signals being a first timing message and a second timing message, wherein the first timing message is output by the first linking device for receipt by the external controller and the second timing message is output by the second linking device for receipt by the external controller; and wherein the first linking device and the second linking device are further configured to:

initiate a first timer and a second timer to monitor a first time period and a second time period, in which respective responses to the first timing message and the second timing message are received, determine whether a response to the first timing message has been received from the external controller by the first linking device within a first time period based upon an evaluation of the first timer, based on the determination that no response to the communicated first timing message has been received from the external controller within the first time period, query, by the first linking device, the second linking device, in order for the first linking device to determine whether the second linking device has received a response to the second timing message from the external controller within the second time period based upon an evaluation of the second timer;

receiving, at the first linking device, a confirmation from the second linking device that the response to the second timing message has been received from the external controller by the second linking device within the second time period; and direct, based upon the confirmation, switching of communications control of the one or more command signals to the second linking device.

15. The system of claim 14, wherein the first linking device is further configured to:

determine, prior to directing the switching, whether the second linking device has received a response to a second timing message output by the second linking device for communication to the external controller.

16. The system of claim 15, wherein the first linking device is further configured to communicate a query to the second linking device in order to determine whether the second linking device has received the response to the second timing message.

17. The system of claim 15, wherein the first linking device is further configured to direct the second linking device to output the second timing message.

18. The system of claim 14, wherein the first timing message and the second timing message comprises messages that are periodically output at a predetermined time interval.

19. The system of claim 14, wherein the first linking device is further configured to determine whether the response has been received from the external controller within the predetermined period of time based at least in part upon an evaluation of the initiated timer.

* * * * *